Patented Jan. 5, 1943

2,307,689

UNITED STATES PATENT OFFICE 2,307,689

HYDROCARBON CONVERSION

Edwin T. Layng, Jersey City, N. J., assignor to The Polymerization Process Corporation, Jersey City, N. J., a corporation of Delaware No Drawing. Application February 29, 1940, Serial No. 321,522

11 Claims. (Cl. 196—10)

This invention relates to the conversion of olefinic hydrocarbons to hydrocarbons of higher boiling points, an improved method for the production of catalytic contact material for said conversion, and a catalytic contact material which exhibits great activity and a long active life.

Certain metal pyrophosphates such as those of copper, silver, cobalt and zinc are useful catalytic contact materials for promoting the polymerization of olefinic hydrocarbons, particularly normally gaseous olefinic hydrocarbons, to higher boiling products. Such pyrophosphates function as catalytic material by the release, (possibly through reduction reactions), of active modifications of the metal pyrophosphates. These active modifications probably constitute the true catalysts for the polymerization reactions.

Such pyrophosphates are employed, preferably in the form of granules, pellets, etc., and the fluid reactants are passed through the interstices of a mass of such granules at suitable conditions of temperature, pressure and time to effect the desired reaction. By this method the fluid reactants may be passed over the catalytic material at relatively high space velocity without excessive pressure drop.

It is found, however, in the use of pellets or granules of the metal pyrophosphates, per se, as catalytic material that the pellets or granules tend to soften, expand and disintegrate during the reaction whereby the mass of catalytic material tends to consolidate and increase the pressure drop through the mass. Consolidation of the granular catalytic material may result in the accumulation within the body of catalytic material of relatively high boiling conversion products which are less easily removed by the flow of the fluid reactants due to the decrease in the velocity of the reactants in their passage through the body of catalytic material. Such deposits decrease the number of active centers in the catalytic material with the result that the conversion rate is decreased. As a result of the increase in pressure drop and decrease in conversion rate the conversion treatment must be terminated before it would be necessary if the granular mass of catalytic material did not become softened with resulting collapse and disintegration.

It is an object of the present invention to provide a conversion treatment wherein the fluid reactants are passed over catalytic contact material containing as an essential active ingredient a metal pyrophosphate, and in the form of granules which are less susceptible to softening and disintegration during the conversion treatment than granules consisting only of the metal pyrophosphate, whereby operating runs of longer duration are made possible but at the same rates of conversion as would be obtained in the presence of granular catalytic material consisting of the said metal pyrophosphate. It is a further object of the invention to provide catalytic contact material, and a method for preparing the same, comprising as an active ingredient a metal pyrophosphate and in the form of granules which are less susceptible to softening and disintegration during the conversion treatment than are granules consisting of the metal pyrophosphate.

In connection with the present invention it has been discovered that the metal pyrophosphates which are named above as being capable of promoting the polymerization of olefins are also capable of forming soluble complexes with ammonia and that the metal pyrophosphates may be regenerated, from the inactive complexes, in an active form by subjecting the complexes to elevated temperature for a sufficient length of time in a non-reducing atmosphere.

In preparing the catalytic contact material one or more metal pyrophosphates desired for use as catalytic material are dissolved in ammonium hydroxide, and the resulting solution is employed to impregnate granular supporting material.

The supporting material preferably is preformed to a size in which it is desired to be employed and should be non-reactive with ammonium hydroxide, the reduction products of the metal pyrophosphate, the reactant fluids or the polymer products. To permit substantial impregnation the granular supporting material should be porous. The granules may be porous naturally or may be produced artificially by forming porous pellets from more finely divided non-porous material.

Charcoal is an excellent supporting material for this purpose since it is naturally porous, can be produced in granular form, and is inert to ammonium hydroxide, pyrophosphates and the reactants. However, other materials of similar characteristics may be employed.

The supporting material, such as charcoal, preferably is employed in the granular size desired in the catalytic material. Granular charcoal having a grain size of 5 to 8 mesh, 6 to 12 mesh or 8 to 14 mesh is particularly suitable when preparing the catalytic material for use in the conversion of normally gaseous olefins.

In the production of the improved catalytic material a solution of the metal pyrophosphate in ammonia is first prepared. Such a solution may be prepared, for example, by dissolving 100 grams of copper pyrophosphate in 200 cc. of concentrated ammonium hydroxide. This solution is then employed to impregnate the granular charcoal, for example, by covering the charcoal with the solution and then alternatively applying and releasing suction on the mixture several times to promote impregnation. Suction to a pressure of 25 mm. of mercury is advantageous in this operation. The mixture preferably is then permitted to stand for some time with or without the further application and release of suction. Agitation of the mixture during this period is desirable to promote impregnation.

After a thorough application the excess solution is filtered off. The granular mass and the impregnated material is then dried, preferably in air. Depending upon the character of the desired catalytic material and the supporting material employed it may be possible to impregnate the supporting material sufficiently in one application of the solution, or it may be necessary to employ several applications with intermediate drying. Optionally with such intermediate drying the impregnated supporting material may be heated to a temperature sufficiently high to drive off all ammonia contained therein.

In heating the dried impregnated material to drive off ammonia and particularly when heating the material after the final application of the impregnating solution it is found necessary to employ a temperature sufficiently high to effect a breakdown of the metal pyrophosphate-ammonia complex since otherwise the resulting material resists reduction of the metal pyrophosphate to the active modification thereof during the conversion treatment. The temperature employed in this operation should not be substantially lower than 750° F., and higher temperatures may be employed advantageously. However, the temperature should not be so high as to effect decomposition of the pyrophosphate. Preferably, the temperature should not exceed about 1500° F., and the temperature range of 1000–1400° F. is preferred for this operation. The actual temperature necessary will vary with the length of time of heating, longer heating times naturally being associated with lower temperatures. For example, a granular charcoal impregnated with a solution of copper pyrophosphate in ammonium hydroxide after drying may be heated advantageously at 1200° F. for two hours to effect the complete removal of ammonia and the production of active catalytic material.

The heating step should be carried out in a non-reducing atmosphere in order to avoid effecting decomposition of the pyrophosphate since temperatures which are high enough to effect the desired breakdown of the metal pyrophosphate-ammonia complex may be sufficiently high to effect substantial decomposition of the pyrophosphate if a reducing agent is present. For example, heating the impregnated support at 1200° F., as described above, but in an atmosphere of hydrogen results in the decomposition of the pyrophosphate with substantial loss in weight and the formation of a residual material which is largely copper phosphide. Conveniently, the regeneration step may be effected in air or in an inert atmosphere such as nitrogen.

*Example*

150 grams of copper pyrophosphate,

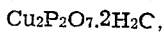

were dissolved in 170 cc. of concentrated ammonium hydroxide. To this solution there were added 150 grams of granular activated charcoal having a mesh size of 5–8. The pressure on the mixture was reduced and then released to atmospheric pressure, and the mixture was shaken to effect intimate mixture of the carbon with the solution. Thereafter the excess solution was drained from the carbon, and it was found that the latter had absorbed 90 cc. of the solution. The impregnated carbon was then placed in an oven at 220° C. until dry. The dried material was then heated in a stream of purified nitrogen, the temperature being raised at 200° F. per hour until a temperature of 1200° F. was attained. The impregnated carbon was held at that temperature for two hours and then allowed to cool slowly to room temperature. The resulting material contained approximately 55 per cent copper pyrophosphate. In appearance it resembled the original charcoal, and it had an apparent density of 0.46.

Catalytic material thus prepared was employed in the conversion of a hydrocarbon gas consisting by volume of 5.3 per cent propylene, 11.8 per cent propane, 9.5 per cent iso butylene, 21.8 per cent normal butylenes and 50.2 per cent butane. The gas, saturated with water vapor at 85° F. and the operating pressure, was passed over the catalytic material at a pressure of 1000 pounds per square inch at a rate of approximately 20 cubic feet (measured as gas at standard conditions of temperature and pressure) per hour per pound of catalytic material. At a reaction temperature of 425° F. the reaction product had a liquid content of approximately 33 per cent by weight and the exit gases were found by analysis to contain 8.1 per cent unsaturates, indicating a conversion of 84 per cent. The run was terminated voluntarily after a production of over 16 gallons of polymer had been produced. The catalytic material was found to be subtsantially in its original form.

It is to be understood that the operating conditions given in the foregoing example may be varied in accordance with the character of the material under treatment and the character of the products desired. However, for the conversion of normally gaseous olefins to gasoline motor fuel temperatures within the range of 300° to 600° F. are to be preferred. Preferably also the pressure should be substantially elevated in order to promote the polymerization reaction. Pressures in excess of 150 pounds per square inch are desirable. Under such conditions the feed rate may vary from 2 to 50 or more cubic feet (measured as gas at standard conditions of temperature and pressure) per pound of catalytic material per hour. The feed rate may be expressed also as volumes of gas per hour per volume of contact material. In the use of catalytic material having an apparent density of the order of magnitude of that described above the charge rate should be approximately 50 to 1500 or more volumes of gas per hour per volume of catalytic contact material.

It is apparent that for any given charge the extent of reaction and the character of the liquid products depend mainly upon the operating pressure, the operating temperature and the space velocity of the charge. Many combinations of these variables will yield the desired amount and quality of product. For example, in the treatment of a gaseous mixture containing substantial quantities of isobutylene it may be desirable to operate at a relatively low temperature or with relatively great space velocity, or both, in order to limit the extent of conversion whereby the product consists largely of the polymers of isobutylene and therefore has a relatively high octane number. Within the range of operating temperatures preferred in the present process (300° to 600° F.) isobutylene is more readily polymerized than normal butylene or propylene whereby selective polymerization may be effected by limiting the extent of conversion as described. Naturally more complete conversion may be effected by raising the temperature or reducing the space velocity, or both.

The moisture content of the reaction mixture apparently has no direct effect on the reaction. However, a saturated charge apparently has a slight beneficial effect in maintaining the original condition of the contact material. In any event, therefore, there is no necessity for complete drying of the charge to the process.

The present invention has the advantage that the catalytic contact material may be prepared in a form containing any desired amount of the pyrophosphate which is distributed through the supporting material with great uniformity. The invention has the further advantage that the catalyst may be employed in the form of preformed granules which can be prepared with a large active surface, thereby producing great activity in the catalytic material.

I claim:

1. The method of converting olefinic hydrocarbons to hydrocarbons of higher boiling points which comprises contacting said olefinic hydrocarbons at elevated temperature with a catalytic contact material comprising a plurality of porous granules of supporting material impregnated with the residue formed by heating a complex of ammonia and a metal pyrophosphate capable of reduction to a polymerization catalyst at a temperature not substantially lower than 750° F. in a non-reducing atmosphere for a time sufficient to effect regeneration of said metal pyrophosphate.

2. The method of claim 1 wherein copper pyrophosphate is employed as said metal pyrophosphate.

3. The method of claim 1 wherein said supporting material is impregnated with the residue formed by heating said complex of ammonia and a metal pyrophosphate to a temperature of 1000°–1400° F. in a non-reducing atmosphere for a time sufficient to effect regeneration of said metal pyrophosphate.

4. The method of claim 1 wherein said supporting material is a granular charcoal.

5. A method for the production of catalytic contact material for promoting polymerization of olefinic hydrocarbons which comprises mixing ammonium hydroxide with a metal pyrophosphate which forms soluble complexes of ammonia and is capable of reduction to a polymerization catalyst to form a solution of said metal pyrophosphate-ammonia complex, mixing the said solution with granular porous supporting material which is inert to the said metal pyrophosphate and the reduction products thereof to impregnate said porous granular material with said solution, drying said impregnated granular material to remove excess water and ammonium hydroxide and then heating said dried granular material at a temperature not substantially lower than 750° F. in a non-reducing atmosphere for a time sufficient to regenerate said metal pyrophosphate from the metal pyrophosphate-ammonia complex contained within said granular material and drive off the ammonia content of said complex.

6. The method of claim 5 wherein copper pyrophosphate is employed as said metal pyrophosphate.

7. The method of claim 5 wherein said impregnated granular material after drying is heated to a temperature of approximately 1000° to 1400° F. to effect regeneration of said metal pyrophosphate.

8. The method in accordance with claim 5 wherein the supporting material employed is a granular charcoal having a grain size within the limits of approximately 6 to 14 mesh.

9. The method of claim 5 wherein said impregnated granular material after drying is subjected to further impregnation with a solution of said metal pyrophosphate-ammonia complex.

10. Catalytic contact material for promoting polymerization of olefinic hydrocarbons which comprises a plurality of porous granules of supporting material impregnated with the residue formed by heating a complex of ammonia and a metal pyrophosphate capable of reduction to a polymerization catalyst at a temperature not substantially lower than 750° F. in a non-reducing atmosphere for a time sufficient to regenerate said metal pyrophosphate.

11. Catalytic contact material for promoting polymerization of olefinic hydrocarbons which comprises a plurality of porous granules of charcoal impregnated with the residue formed by heating a copper pyrophosphate-ammonia complex at a temperature of 1000°–1400° F. in a non-reducing atmosphere for a time sufficient to regenerate said metal pyrophosphate.

EDWIN T. LAYNG.